United States Patent
Desnoyer et al.

(10) Patent No.: US 9,821,817 B2
(45) Date of Patent: Nov. 21, 2017

(54) OPERATING METHOD FOR A VEHICLE IN MANUAL MODE AND IN AUTONOMOUS MODE

(71) Applicant: RENAULT s.a.s., Boulogne Billancourt (FR)

(72) Inventors: Francois Desnoyer, Paris (FR); Sabine Langlois, Paris (FR); Frederic Horps, Le Chesnay (FR)

(73) Assignee: RENAULT s.a.s., Boulogne Billancourt (FR)

( * ) Notice: Subject to any disclaimer, the term of this patent is extended or adjusted under 35 U.S.C. 154(b) by 74 days.

(21) Appl. No.: 14/894,184

(22) PCT Filed: May 15, 2014

(86) PCT No.: PCT/EP2014/059903
§ 371 (c)(1),
(2) Date: Nov. 25, 2015

(87) PCT Pub. No.: WO2014/191210
PCT Pub. Date: Dec. 4, 2014

(65) Prior Publication Data
US 2016/0103449 A1    Apr. 14, 2016

(30) Foreign Application Priority Data

May 27, 2013    (FR) ...................... 13 54745

(51) Int. Cl.
*B60W 50/08*    (2012.01)
*B60W 50/00*    (2006.01)
(Continued)

(52) U.S. Cl.
CPC .......... *B60W 50/082* (2013.01); *B60W 10/04* (2013.01); *B60W 10/18* (2013.01);
(Continued)

(58) Field of Classification Search
CPC ............... B60W 50/082; B60W 50/14; B60W 50/0097; B60W 30/12; B60W 30/16; B60W 2050/0096; B60W 2550/402; B60K 28/06
See application file for complete search history.

(56) References Cited

U.S. PATENT DOCUMENTS

| 5,485,892 | A  | * | 1/1996 | Fujita | ............... | B60W 30/16 |
|           |    |   |        |        |                 | 701/70     |
| 2006/0089765 | A1 | * | 4/2006 | Pack | ............... | G05D 1/0061 |
|           |    |   |        |        |                 | 701/23     |

(Continued)

FOREIGN PATENT DOCUMENTS

| DE | EP 2314490 B1 * | 8/2012 | ............ B60W 50/14 |
| DE | 10 2011 082 375 A1 | 3/2013 | |
| EP | 2 314 490 A1 | 4/2011 | |

OTHER PUBLICATIONS

Espacenet translation of EP2314490(A1), Siedersberger et al, Apr. 27, 2011, 16 pages.*

(Continued)

*Primary Examiner* — Dale W Hilgendorf
(74) *Attorney, Agent, or Firm* — Oblon, McClelland, Maier & Neustadt, L.L.P.

(57) ABSTRACT

An operating method for a vehicle includes driving in a manual mode, in which a longitudinal movement and a lateral movement are controlled by a human driver, and driving in an autonomous mode, in which the longitudinal movement and the lateral movement are controlled by an automated system. In the method, driving in semi-autonomous mode is activated from the autonomous mode by the human driver either resuming the longitudinal movement, such that the automated system continues to control the lateral movement, or resuming the lateral movement, such that the automated system continues to control the longitu- (Continued)

dinal movement. In the semi-autonomous mode, one or more automatic stop operations brake the vehicle when the human driver does not quickly resume control of the lateral movement and the longitudinal movement, which continues to be controlled by the automated system.

8 Claims, 4 Drawing Sheets

(51) Int. Cl.
*B60W 50/14* (2012.01)
*B60W 10/18* (2012.01)
*B60W 10/04* (2006.01)
*G05D 1/00* (2006.01)
*B60W 30/12* (2006.01)
*B60K 28/06* (2006.01)
*B60W 30/16* (2012.01)

(52) U.S. Cl.
CPC ........ *B60W 30/12* (2013.01); *B60W 50/0097* (2013.01); *B60W 50/14* (2013.01); *G05D 1/0061* (2013.01); *B60K 28/06* (2013.01); *B60W 30/16* (2013.01); *B60W 2050/0096* (2013.01); *B60W 2540/00* (2013.01); *B60W 2550/402* (2013.01); *B60W 2720/00* (2013.01)

(56) References Cited

U.S. PATENT DOCUMENTS

2006/0235615 A1\* 10/2006 Kato .................... B60W 50/14
701/300
2010/0138123 A1\* 6/2010 Tokimasa ............. B60W 10/06
701/70

OTHER PUBLICATIONS

International Search Report dated Jul. 8, 2014 in PCT/EP14/059903 Filed May 15, 2014.
French Search Report dated Jan. 23, 2014 in French Application 1354745 Filed May 27, 2013.

\* cited by examiner

OPERATING METHOD FOR A VEHICLE IN MANUAL MODE AND IN AUTONOMOUS MODE

FIELD OF THE INVENTION

The invention relates to a method and an automated system for supervising operation of a vehicle in manual driving mode and in autonomous driving mode.

BACKGROUND

The driving assistance systems, for example remote controlled speed regulators, enable a human driver to be relieved of some of his or her driving activity on automated systems. These systems are currently widespread on the market, and their functions are increasingly associated with one another to render the vehicle completely autonomous. Such a vehicle type enables the driver to benefit from driving delegation services over all or part of the duration of his or her journey. These driving delegation services can notably be offered when the traffic conditions are dense and the average speed of the vehicle is very low. The manner in which the driver delegates the driving and in which the system hands control to the driver are absolutely essential to the quality of the service provided, and to the dependability of the system. There are procedures for activating and deactivating longitudinal control systems of the vehicle as in the case of a speed regulator or of a distance control system. There are also procedures for activating and deactivating lateral control systems like the line crossing detection systems or lane holding systems. For each of these systems taken separately, it is fairly easy for the driver to know if it is he or she who has control or if it is the automatic system. An autonomous vehicle system of the type to which the invention applies proposes coupling the longitudinal control of the vehicle with the lateral control. The entry into autonomous mode is then achieved by releasing the hands from the steering wheel, then the feet from the pedals (or vice versa), in actions which are not always perfectly synchronized, with the effect of creating situations in which the driver does not know in which state the vehicle is being driven by the automatic systems.

To illustrate the prior state of the art, the document U.S. Pat. No. 8,260,482 discloses a user interface for displaying an internal autonomous driving system state. In manual mode, the interface indicates to the user that the system is ready to operate in autonomous mode based on a variety of information notably comprising a geographic location of the vehicle. The method and the system disclosed do however present a number of problems, including that for the user of precisely knowing the current driving mode at each instant and that for the system of unambiguously managing each of the driving modes.

BRIEF SUMMARY OF THE INVENTION

The subject of the invention is a method for operating a vehicle comprising at least one step of driving in manual mode in which a longitudinal displacement and a lateral displacement are controlled by a human driver and at least one step of driving in autonomous mode in which the longitudinal displacement and the lateral displacement are controlled by an automated system.

To address the problems of the prior state of the art, at least one step of driving in semi-autonomous mode is activated in the method from the autonomous mode by a resumption of control by the human driver either of the longitudinal displacement such that the automated system continues to control the lateral displacement, or of the lateral displacement such that the automated system continues to control the longitudinal displacement.

In particular, one or more automatic stopping steps activated in semi-autonomous mode consist in braking the vehicle when the human driver does not quickly take back control of the lateral displacement and of the longitudinal displacement which continues to be controlled by the automated system.

Preferably, one or more alarm steps activated in semi-autonomous mode consist in prompting the human driver to quickly take back control of the lateral displacement and of the longitudinal displacement which continues to be controlled by the automated system.

Advantageously, the step of driving in manual mode is activated from the semi-autonomous mode when the human driver takes back control of the longitudinal displacement and the lateral displacement.

Also advantageously, the step of driving in autonomous mode is activated from the manual mode when, in an autonomous mode activatable step, the human driver releases his or her control both on the longitudinal displacement and on the lateral displacement.

More particularly, the autonomous mode activatable step is activated by reception of a signal indicating an explicit will of the human driver to switch to autonomous mode provided autonomous mode is possible.

Favorably, the step of driving in autonomous mode is activated from the semi-autonomous mode when the human driver quickly releases his or her control on the longitudinal displacement or on the lateral displacement.

Another subject of the invention is a computer program comprising program code instructions for the execution of the steps of the method according to the invention when said program is run on a computer.

Yet another subject of the invention is an automated system comprising a computer in which is installed a computer program according to the invention.

The final subject of the invention is a vehicle, notably a motor vehicle, comprising an automated system according to the invention.

BRIEF DESCRIPTION OF THE DRAWINGS

The invention will be better understood through examples of implementation of steps of the method according to the invention with reference to the attached drawings, in which.

DETAILED DESCRIPTION

In the method for operating a vehicle explained with reference to FIG. 1, a step 144 of driving in manual mode consists in leaving a human driver to control a longitudinal displacement and a lateral displacement of the vehicle. The longitudinal displacement is then controlled in the usual way by means of manual speed control members of the vehicle such as the accelerator and brake pedals. The lateral displacement is similarly controlled in the usual way by means of manual steering control members of the vehicle, such as the steering wheel.

The step 144 thus reproduces a standard vehicle operation which, in the absence of the invention, could as it were be constantly activated.

A vehicle, notably a motor vehicle according to the invention, comprises an automated system in which automatic control actuators, otherwise known, are driven by a computer in which is installed a computer program comprising program code instructions for the execution of steps of the method explained below when the program is run on the computer. The computer is typically a computer embedded in the vehicle, capable of communicating with other embedded computers via a field network such as a Controller Area Network (CAN), Local Interconnect Network (LIN) or similar network and of optionally, but not necessarily, communicating with remote equipment items such as positioning satellites associated with an embedded navigation apparatus or such as centralized databases that can be accessed by a telecommunication apparatus.

The method is now explained by means of a grafcet representation in which it will be recalled that a transition following one or more preceding steps is validated by a detection of one or more predefined events when all or part of said preceding step or steps is/are active and that a validation of said transition activates one or more subsequent steps and deactivates said preceding step or steps, in accordance with the grafcet representation conventions. It will be understood that this representation has been chosen for the clarity that it provides and that it is in no way limiting. A representation in the form of a computer flow diagram, a combinational logic circuit or any other hardware mechanism, is similarly covered by the explanations which follow, the method not being limited beyond the actions which are executed in the steps which are essential to it and the conditions governing the execution of these actions.

In the method implemented for example by involving the automated system indicated above, the step 144 of driving in manual mode is preferably activated by default from an initial step 140, regardless of the possible driving modes, when the vehicle is started up by the human driver.

From the step 140, a transition 145 is validated when the driving of the vehicle in autonomous mode is possible and a transition 141 is validated when, conversely, the driving of the vehicle in autonomous mode is not possible.

Figure 1:
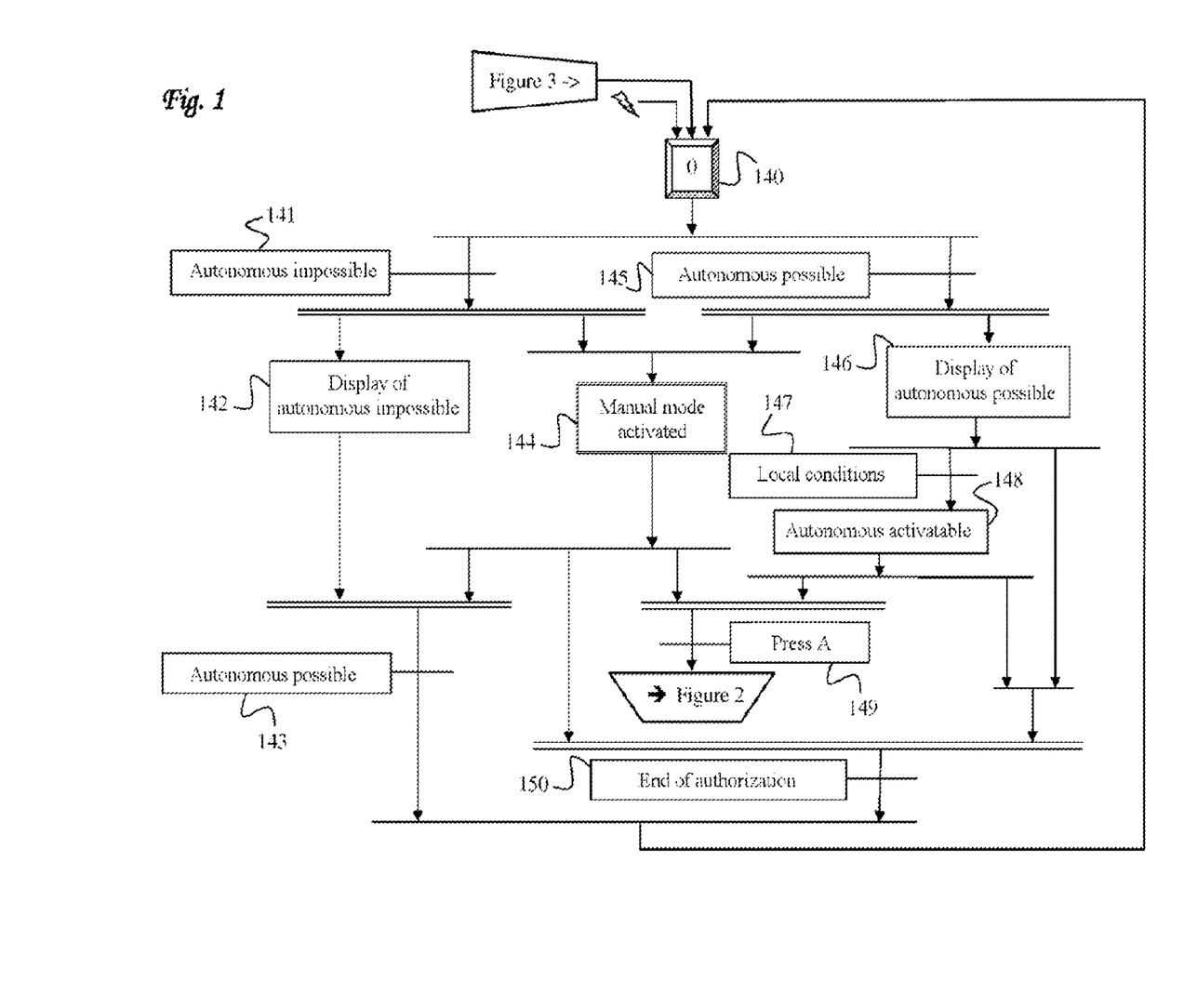
FIG. 1 shows steps of the method according to the invention in manual mode.

The purpose of the steps now described with reference to FIG. 1 is essentially to supervise a transition from manual driving mode to an autonomous driving mode explained later with reference to FIG. 2. In the autonomous driving mode, the longitudinal displacement and the lateral displacement of the vehicle are controlled by the automated system without intervention from the human driver.

The conditions for validation of the transition 145 are for example entered in a table in memory of the automated system. As a purely illustrative and non-exhaustive example, they can comprise a condition of speed of vehicle below a predefined threshold, a location of the vehicle in a zone appropriate to driving in autonomous mode.

Parallel to the step 144 of activated manual mode which is activated regardless of which of the transitions 141 and 145 is validated, a step 146 of displaying driving in autonomous mode possible is activated when the transition 145 is validated and a step 142 of displaying driving in autonomous mode impossible is activated when the transition 141 is validated. The term displaying in the steps 142 and 146, to be taken in its widest sense, can denote both a visual and audible indication, permanent or on demand, and a simple absence of indication in the step 142 for example as long as the indication of step 146 is not present.

From a logical conjunction of the step 142 and of the step 144, a transition 143 is validated when the driving of the vehicle in autonomous mode becomes possible. From a logical conjunction of the step 146 and of the step 144, a transition 150 is validated when a transition from driving of the vehicle in autonomous mode is no longer authorized. The end of authorization of transition to autonomous mode which validates the transition 150 can result from a possible end of autonomous mode; it can also result from other events as will be seen hereinbelow.

A logical disjunction of validation of the transition 143 or of the transition 150, reactivates the initial step 140 for redirecting the automatic system to the appropriate branch of the manual operating mode.

From the step 146 activated subject to the condition that autonomous mode is possible, a transition 147 is validated by reception, in the automated system, of a signal indicating an explicit will of the human driver to switch to autonomous mode. The signal can result from a press on a button A, from a hand lever movement on the steering wheel by the human driver, from a selection on a touch screen or from a univocal voice recognition of an oral command spoken by the human driver possibly accompanied by a confirmation sequence.

A validation of the transition 147 activates a step 148 of autonomous mode activatable. In the step 148, the automated system signals to the human driver that it is ready to take control of the driving of the vehicle and prompts him or her to rapidly release the pedals and the steering wheel. For as long as the human driver keeps his or her hands on the steering wheel or his or her foot on one of the pedals, the computer of the automated system recognizes the commands from the human driver which result therefrom to drive the automatic control actuators. Simultaneously, the computer of the automated system arms a timer to measure the time during which the human driver keeps his or her hands on the steering wheel or his or her foot on one of the pedals.

If the measured duration reaches a predefined time limit, generally very short, of the order of a second, the transition 150 is validated so that the releasing of the controls by the human driver is short term after his or her explicit request to switch to autonomous mode. It is important that the transition to autonomous mode does not occur too late, at a moment which could surprise the human driver or which would no longer be in accordance with the conditions for switching to autonomous mode at the instant at which the explicit request was formulated by the human driver.

From a logical conjunction of the step 142 and of the step 144, a transition 149 is validated when the human driver releases his or her control both on the pedals in relation to the longitudinal displacement and on the steering wheel in relation to the lateral displacement.

A validation of the transition 149 then activates the step 244 of driving in autonomous mode now explained with reference to FIG. 2.

In the autonomous driving mode, the automated system handles all of the control both in longitudinal displacement and in lateral displacement of the vehicle in order to rest the lower and upper limbs of the human driver and free him or her of certain tedious tasks such as those of constantly concentrating on his or her speedometer and the road signs to ensure that a speed limit is not being infringed.

The human driver can rest his or her feet as best seems fit as with a conventional speed regulator. Unlike a conventional speed regulator for which the speed setpoint is set by the human driver then kept constant until the human driver modifies it, the speed setpoint is here adapted according to speed limits indicated by the maps of the navigation apparatus or the speed of a vehicle in front whose distance is evaluated by a radar rangefinder or a camera.

Similarly, the human driver can rest his or her hands as best seems fit because the conventional trajectory and stability control is supplemented by a lane recognition mechanism on the road through a camera in combination with an itinerary given by the navigation apparatus.

From the step 244 of autonomous mode activated, a transition 245 is validated by a manifestation of presence of the human driver when he or she wants to take back control of the vehicle in manual driving mode.

A validation of the transition 245 activates a step 340 of driving in semi-autonomous mode now explained with reference to FIG. 3.

More specifically, the transition 245 in fact combines two transitions of taking back control by the human driver. A transition 341 is validated when the automated system detects a torque applied to the steering wheel by the human driver to take back control of the lateral displacement. A transition 351 is validated when the automated system detects a load applied to the brake or accelerator pedal by the human driver to take back control of the longitudinal displacement.

A validation of the transition 341 activates an alarm step 342 in logical conjunction with the step 340 of driving in semi-autonomous mode. The alarm step 342 consists in prompting the human driver to quickly take back control of the longitudinal displacement which for the time being continues to be controlled by the automated system, by pressing on the brake or accelerator pedal, by means of a visual display and/or an audible message.

Simultaneously in one of the steps 340 or 342, the computer program arms a timer to measure a delay which separates the resumption of control of the pedals from the resumption of control of the steering wheel.

A transition 343 is validated when the delay is exceeded.

A validation of the transition 343 activates an automatic stopping step 344 which consists in braking the vehicle when the human driver does not quickly take back control of the longitudinal displacement which continues to be controlled by the automated system. During the braking of the vehicle in the step 344, the automated system recognizes the steering control which results from the torque applied to the steering wheel by the human driver. The slowing down of the vehicle is sufficiently discouraging to urge the human driver to rapidly take back full control of the vehicle.

A transition 345 is validated when the vehicle reaches a zero speed.

A validation of the transition 345 activates a step 346 which consists in engaging the automatic parking brake and returning to the initial step 140.

At any moment from the step 342 or from the step 344 as long as the step 346 is not reached, a transition 347 is validated when the automated system detects a press on the brake or accelerator pedal.

A validation of the transition 347 from the step 340 of driving in semi-autonomous mode in conjunction with the steps 342 and 344 reactivates the step 144 of driving in manual mode explained previously with reference to FIG. 1.

A validation of the transition 351 activates an alarm step 352 in logical conjunction with the step 340 of driving in semi-autonomous mode. The alarm step 352 consists in prompting the human driver to quickly take back control of the lateral displacement which for the time being continues to be controlled by the automated system, by gripping the steering wheel, by means of a visual display and/or an audible message.

Simultaneously in one of the steps 340 or 352, the computer program arms a timer to measure a delay which separates the resumption of control of the steering wheel from the resumption of control of the pedals.

A transition 353 is validated when the delay is exceeded.

A validation of the transition 353 activates an automatic stopping step 354 which consists in braking the vehicle when the human driver does not quickly take back control of the lateral displacement which continues to be controlled by the automated system. During the braking of the vehicle in the step 344, the automated system recognizes the braking control which results from the pressure applied to the brake pedal by the human driver. However, a detection of pressure on the accelerator pedal has no effect on the braking imposed in the step 354. The slowing down of the vehicle is sufficiently discouraging to urge the human driver to quickly take back full control of the vehicle.

A transition 355 is validated when the vehicle reaches a zero speed.

A validation of the transition 355 activates a step 356 which consists in engaging the automatic parking brake and returning to the initial step 140.

At any moment from the step 352 or from the step 354 as long as the step 356 is not reached, a transition 357 is validated when the automated system detects a torque applied manually to the steering wheel.

A validation of the transition 357 from the step 340 of driving in semi-autonomous mode in conjunction with the steps 352 and 354 reactivates the step 144 of driving in manual mode explained previously with reference to FIG. 1.

In a variant embodiment, the transition 355 and the step 356 can be replaced respectively by the transition 345 and the step 346 which are similar to them.

Thus, the return to manual driving mode to leave the autonomous driving mode via the semi-autonomous mode is activated when the human driver takes back control of the longitudinal displacement and the lateral displacement. The transitional switch to autonomous mode is short-lived if the human driver simultaneously takes back control of the longitudinal displacement and the lateral displacement, the transitions 347 and 357 being immediately validated following the transitions 341 and 351.

Figure 4:
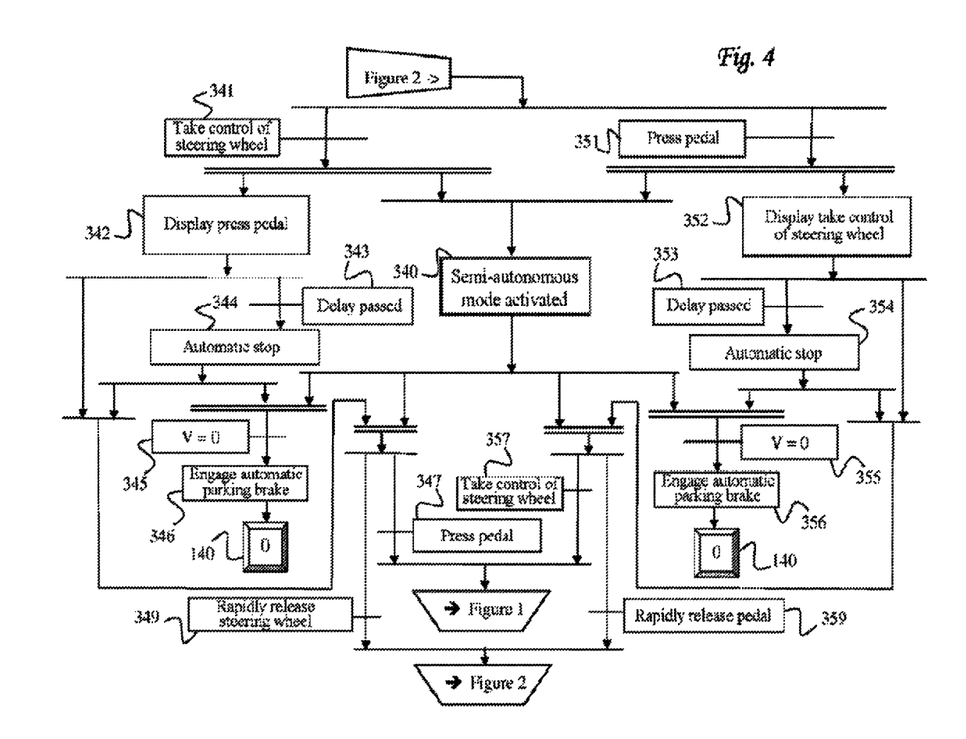
FIG. 4 shows steps of a method variant according to the invention in semi-autonomous mode.

The implementation variant of the method presented with reference to FIG. 4 offers the possibility of reverting to autonomous driving mode when the resumption of control of a control by the human driver is not sufficiently asserted to mark a firm will on the part of the human driver to return to manual driving mode.

In the step 342, the automated system temporarily stores a maximum torque level applied to the steering wheel from the validation of the transition 341 and arms a short-term timer, for example of the order of three seconds.

A transition 349 of rapid releasing of the steering wheel is validated when the maximum torque level temporarily stored is below a predefined threshold and the human driver rapidly releases his or her control on the lateral displacement before the short term of the timer runs out.

In the step 352, the automated system temporarily stores a maximum pressure level applied to one of the pedals from the validation of the transition 351 and arms a short-term timer, for example of the order of three seconds.

A transition 359 of rapid releasing of the pedal is validated when the maximum pressure level temporarily stored is below a predefined threshold and the human driver rapidly releases his or her control on the longitudinal displacement before the short term of the timer runs out.

A validation of the transition 349 or of the transition 359 from the step 340 of driving in semi-autonomous mode then reactivates the step 244 of driving in autonomous mode explained above with reference to FIG. 2.

Figure 3:
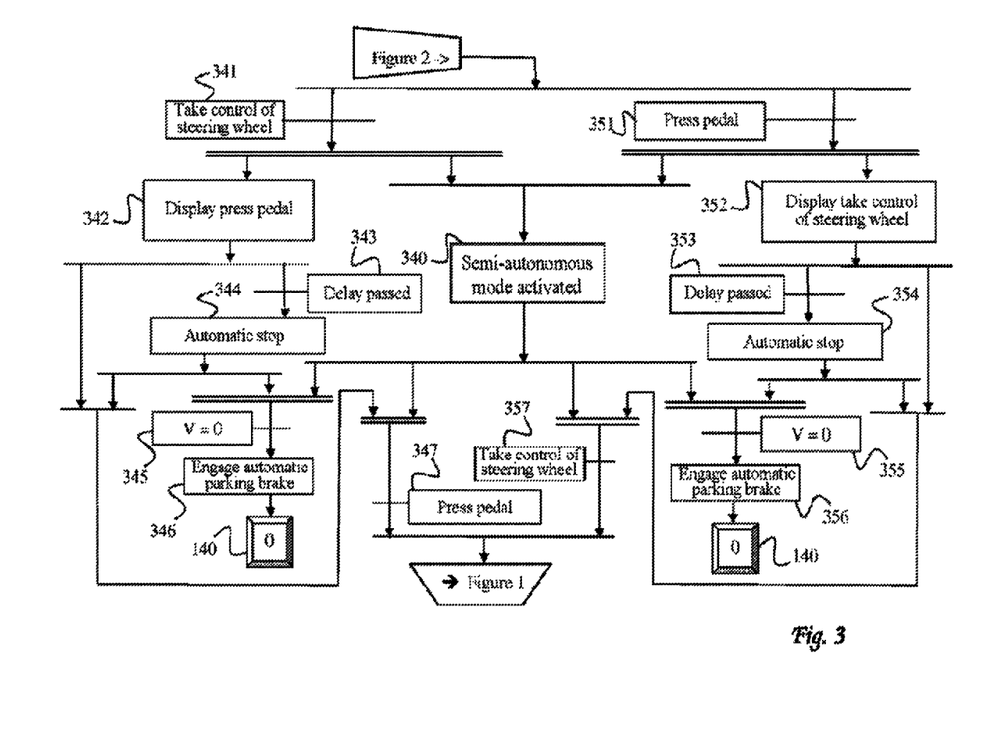
FIG. 3 shows steps of the method according to the invention in semi-autonomous mode.

The autonomous mode can be exited at any instant upon the initiative of the human driver by passing through the semi-autonomous mode, irreversibly in the variant of FIG. 3 or reversibly subject to certain conditions in the variant of FIG. 4.

Other exits from the autonomous mode can be envisaged without departing from the context of the present invention regardless of the autonomous mode structure chosen.

Figure 2:
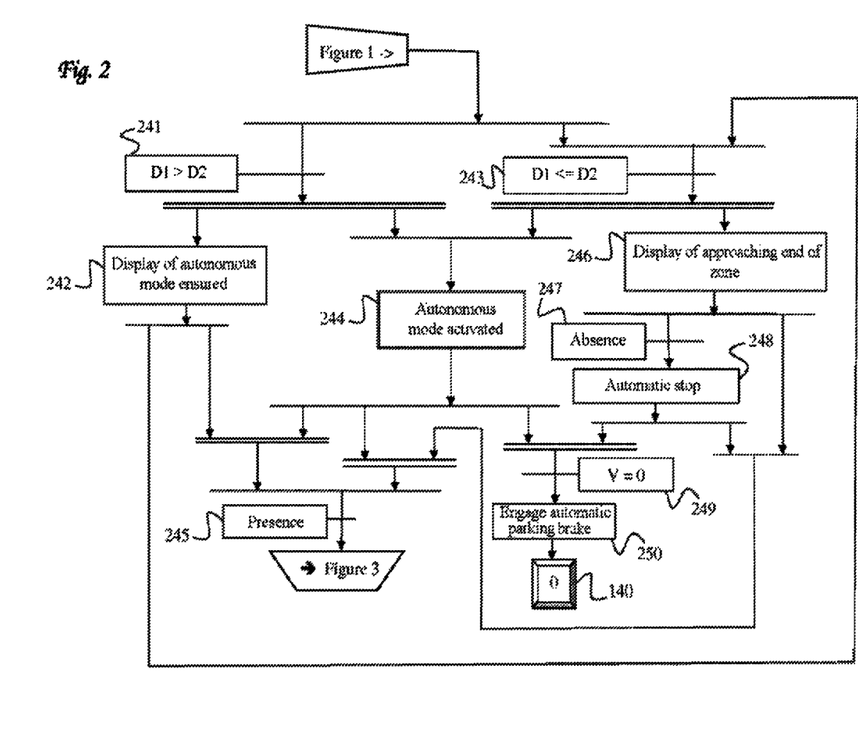
FIG. 2 shows steps of the method according to the invention in autonomous mode.

The autonomous mode illustrated by FIG. 2 comprises, on the one hand, a step 242 of display of autonomous mode assured, activated by a transition 241 which is validated when the vehicle is at a distance D1 greater than a distance D2 from end of zone which requires a return to manual mode.

The example of autonomous mode, out of other possible examples, illustrated by FIG. 2, also comprises a step 246 of display of approach of end of zone, activated by a transition 243 which is validated when the vehicle is at a distance D1 less than or equal to the distance D2 from end of zone which requires a return to manual mode.

The transition 245 explained previously for activating the semi-autonomous mode is eligible for validation equally from a logical conjunction of the step 242 and of the step 244 or a logical conjunction of the step 244 and of the step 246.

The transition 245 for activating the semi-autonomous mode is also eligible for validation from a logical conjunction of the step 244 and of an automatic stopping step 248 which is activated by a transition 247 validated in the absence of intervention from the human driver when the vehicle approaches an end of zone of driving possible in autonomous mode as displayed in the step 246.

A transition 249 is validated when the vehicle reaches a zero speed.

A validation of the transition 249 activates a step 250 which consists in engaging the automatic parking brake and returning to the initial step 140.

At any moment from the step 246 or from the step 248 as long as the step 250 is not reached, the transition 245 is validated when the automated system detects a torque applied to the steering wheel or a press on the brake or accelerator pedal.

A validation of the transition 245 from the step 244 of driving in autonomous mode in conjunction with one or other of the steps 246 and 248 activates the step 340 of driving in semi-autonomous mode which provokes a more pronounced slowing down of the vehicle than in the step 248 so as to strongly urge the human driver to take back all control of the driving of the vehicle.

The invention claimed is:

1. A method for operating a vehicle comprising:
controlling at least one manual driving mode in which a longitudinal displacement and a lateral displacement are controlled by a human driver;
controlling at least one autonomous driving mode in which the longitudinal displacement and the lateral displacement are controlled by an automated system;
activating driving in a semi-autonomous mode from the autonomous driving mode via resumption of control by the human driver either of the longitudinal displacement such that the automated system continues to control the lateral displacement, or of the lateral displacement such that the automated system continues to control the longitudinal displacement; and
reverting to the autonomous driving mode when the human driver does not take back control of the lateral displacement by operating a steering wheel of the vehicle with a predetermined amount of torque within a predetermined period of time or of the longitudinal displacement by applying the brakes with a predetermined amount of pressure within the predetermined period of time.

2. The method as claimed in claim 1, further comprising:
activating one or more alarm operations in the semi-autonomous mode to prompt the human driver to take back control of the lateral displacement and of the longitudinal displacement which continues to be controlled by the automated system.

3. The method as claimed in claim 1, further comprising:
activating the at least one driving in the manual driving mode from the semi-autonomous mode when the human driver takes back control of the longitudinal displacement and the lateral displacement.

4. The method as claimed in claim 1, further comprising:
activating the at least one driving in the autonomous driving mode from the manual driving mode when, in an autonomous mode activatable operation, the human driver releases control of both the longitudinal displacement and the lateral displacement.

5. The method as claimed in claim 4, wherein the autonomous driving mode activatable operation is activated by reception of a signal indicating an explicit will of the human driver to switch to the autonomous driving mode provided that autonomous driving mode is possible.

6. The method as claimed in claim 1, further comprising:
activating the at least one of driving in the autonomous driving mode from the semi-autonomous mode when the human driver releases his or her control on the longitudinal displacement or on the lateral displacement.

7. A non-transitory computer readable medium having computer readable instructions stored thereon which when executed by a computer cause the computer to perform a method comprising:
controlling at least one manual driving mode in which a longitudinal displacement and a lateral displacement are controlled by a human driver;
controlling at least one autonomous driving mode in which the longitudinal displacement and the lateral displacement are controlled by an automated system;
activating driving in a semi-autonomous mode from the autonomous driving mode via resumption of control by the human driver either of the longitudinal displacement such that the automated system continues to control the lateral displacement, or of the lateral displacement such that the automated system continues to control the longitudinal displacement; and
reverting to the autonomous driving mode when the human driver does not take back control of the lateral displacement by operating a steering wheel of the vehicle with a predetermined amount of torque within a predetermined period of time or of the longitudinal displacement by applying the brakes with a predetermined amount of pressure within the predetermined period of time.

8. A vehicle comprising:
  circuitry configured to
    control at least one manual driving mode in which a longitudinal displacement and a lateral displacement are controlled by a human driver,
    control at least one autonomous driving mode in which the longitudinal displacement and the lateral displacement are controlled by an automated system,
    activate driving in a semi-autonomous mode from the autonomous driving mode via resumption of control by the human driver either of the longitudinal displacement such that the automated system continues to control the lateral displacement, or of the lateral displacement such that the automated system continues to control the longitudinal displacement, and
    revert to the autonomous driving mode when the human driver does not take back control of the lateral displacement by operating a steering wheel of the vehicle with a predetermined amount of torque within a predetermined period of time or of the longitudinal displacement by applying the brakes with a predetermined amount of pressure within the predetermined period of time.

* * * * *